United States Patent

George

[11] 4,070,126
[45] Jan. 24, 1978

[54] GUSSETED CONNECTORS

[75] Inventor: Henry Howard George, Louisville, Ky.

[73] Assignee: Chemetron Corporation, Chicago, Ill.

[21] Appl. No.: 723,391

[22] Filed: Sept. 15, 1976

[51] Int. Cl.² .............................................. B25G 3/34
[52] U.S. Cl. .................................. 403/271; 403/217; 403/205; 403/406
[58] Field of Search .......................... 403/169–178, 403/205, 217–219, 270–272, 403–406, 345; 285/188; 135/3 R, 7.1 R; 52/693, 655

[56] References Cited

U.S. PATENT DOCUMENTS

| 535,188 | 3/1895 | Barnes et al. | 403/271 X |
| 1,882,673 | 10/1932 | Ronan | 403/270 |
| 2,195,327 | 3/1940 | Dean | 403/406 X |
| 2,487,169 | 11/1949 | Newell | 403/270 X |
| 3,779,656 | 12/1973 | Guy et al. | 403/174 |

Primary Examiner—Wayne L. Shedd
Attorney, Agent, or Firm—N. M. Esser

[57] ABSTRACT

In a connector, as used to interconnect structural members in a trusswork, an elbow and a pipe, which may be another elbow, are provided with suitable slots receiving a plate, and the elbow, pipe, and plate are welded together.

7 Claims, 4 Drawing Figures

GUSSETED CONNECTORS

BACKGROUND OF THE INVENTION

Cross-reference is made to U.S. patent Application Ser. No. 679,335, filed Apr. 22, 1976, by Robert Charles Paulin and Ronald Joseph Billings, U.S. patent Application Ser. No. 679,338, filed Apr. 22, 1976, by Ronald Paul Glanz, U.S. patent Application Ser. No. 679,337, filed Apr. 22, 1976, by John Leonard Carberry, and U.S. patent Application Ser. No. 679,098, filed Apr. 22, 1976, by Henry Howard George and Ronald Joseph Billings, said applications being commonly assigned to the assignee of this application. As disclosed in said applications, structural connectors made from arcuate elbows have particular utility to interconnect structural members in a trusswork, as in an offshore drilling platform.

SUMMARY OF THE INVENTION

As an improvement in a connector comprising an elbow and a pipe, which may also be an elbow, the elbow and the pipe are respectively provided with parallel slots adapted to receive a plate, a plate is installed in the slots, and the elbow, pipe, and plate are welded together. If the pipe also is an elbow, the slots may include a slot in an outer peripheral portion of each elbow and a slot in an inner peripheral portion of each elbow.

DETAILED DESCRIPTION OF THE EMBODIMENTS

Figure 1:
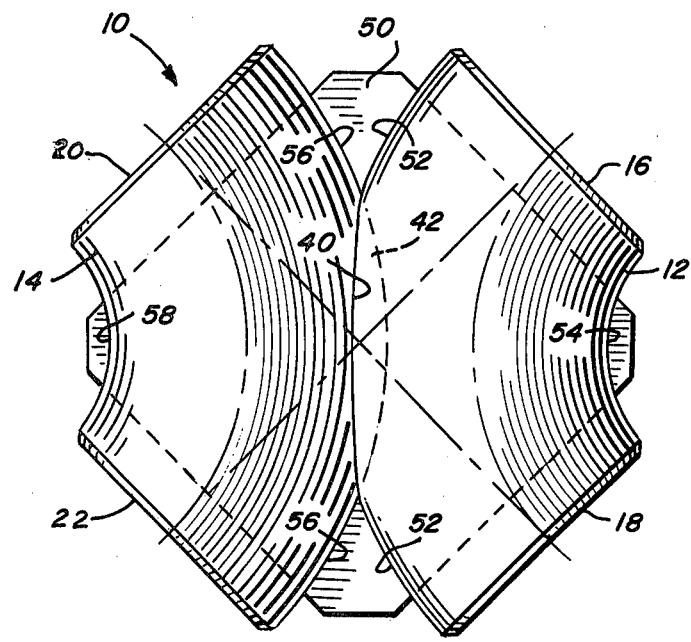
FIGS. 1, 3, and 4, respectively, are elevational views of several connectors constituting possible embodiments of this invention.
Figure 2:
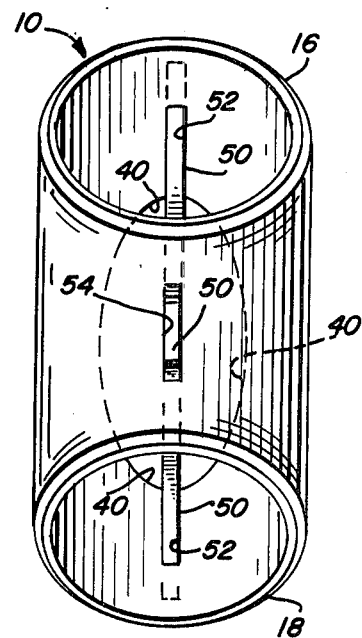
FIG. 2 is a side elevational view taken from the right-hand side of FIG. 1.

In FIGS. 1 and 2, a double-sigmoid connector 10 is shown to comprise a pair of arcuate elbows 12 and 14 respectively; cf. the application cross-referenced above. Except as noted below, each elbow is identical. Typically, each elbow may be made of forged steel with 48-inch outer diameter and 1.25-inch wall thickness. Each elbow is shown to have a 90° included angle between its ends but may have any other greater or lesser included angle as appropriate. Conventional elbows in these sizes have been commercially available from Chemetron Corporation, Tube Turns Division, Louisville, Ky. 40201, for many years.

In the connector 10, the elbows 12 and 14 have coplanar arcuate central axis, and each elbow has opposite ends normal to its centerline. The connector 10 is symmetrical about an axis through the midpoints of these centerlines.

Opposite ends 16 and 18 of the elbow 12 and opposite ends 20 and 22 of the elbow 14 are adapted to be connected respectively by circumferential weldments (not shown) to structural pipes (not shown) of suitable diameter and wall thickness. The ends 16 and 18 and the ends 20 and 22 may be beveled in conventional manner as desired to accommodate such weldments.

A sector (not shown) of the elbow 12 is removed so as to leave an opening 40 in the elbow 12. Such an opening may be referred to as "scalloped". A sector 42 (phantom lines) may but need not similarly be removed so as to leave a corresponding opening in the elbow 14.

A plate 50, which has a truncated square shape as shown in FIG. 1, but may have any other appropriate shape, is used as a gusset to reinforce the connector 10. The plate 50 is installed in suitable slots as described below.

A slot 52 is provided in an outer peripheral portion of the elbow 12 so as to extend in opposite directions from the opening 40. A slot 54 is privided in an inner peripheral portion of the elbow 12. Corresponding slots 56 and 58 respectively are provided in the elbow 14. These slots are coplanar, as shown in FIG. 2, and are adapted to receive the plate 50, when the elbows 12 and 14 are suitably positioned, as shown in FIG. 1. After the plate 50 is installed as shown in FIG. 1, the elbows 12 and 14 and the plate 50 are joined together — by conventional weldments, on opposite sides of the plate 50, along the margins of the opening 40 and the aforesaid respective slots — so as to provide a gusseted structural connector.

Figure 3:
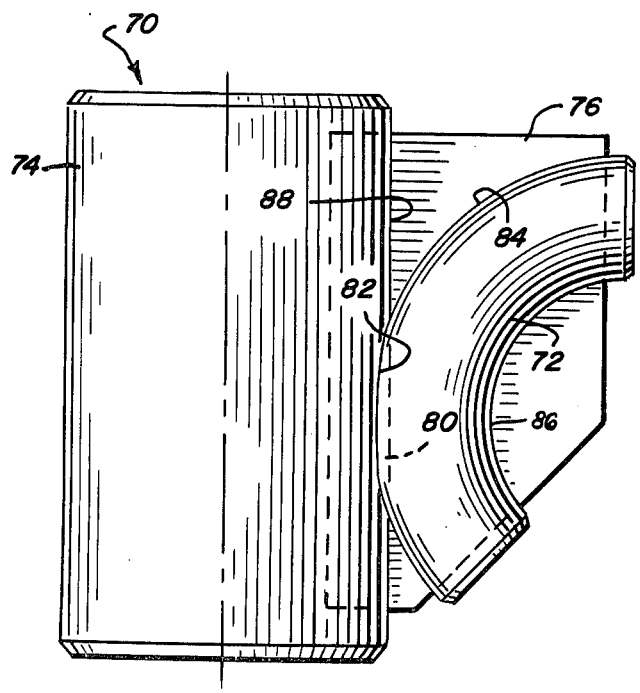

In FIG. 3, a connector 70 is shown to comprise an elbow 72, a length of straight pipe 74 instead of another elbow, and a plate 76. As shown, the pipe 74 is substantially larger than the elbow 72 in outer diameter but may be of an equal or smaller size.

In the connector 70, the elbow 72 is shown to have a 135° included angle between its ends, and the centerline of the elbow 72 is coplanar with the centerline of the pipe 74, and opposite ends of the elbow 72 are normal to its centerline. As shown, the connector 70 is assymetrical, whereby the elbow 72 has opposite ends respectively defining an axis normal to the centerline of the pipe 74 and an axis oblique to the centerline of the pipe 74.

A sector 80 (phantom lines) of the pipe is removed so as to leave an elongated or scalloped opening 82 (whose curvature may not be precisely shown in the drawing) in an outer peripheral portion of the pipe 74. A sector (not shown) may similarly be removed so as to leave a corresponding opening in the elbow 72.

A slot 84 is provided in an outer peripheral portion of the elbow 72. A slot 86 is provided in an inner peripheral portion of the elbow 72. A slot 88 is provided in a longitudinal peripheral portion of the pipe 74 so as to extend in opposite directions from the opening 82. These slots, which are coplanar, are adapted to receive the plate 76 as shown in FIG. 3. After the plate 76 is installed as shown in FIG. 3, the elbow 72, pipe 74, and plate 76 are joined together— by conventional weldments, on opposite sides of the plate 76, along the margins of the opening 82, and the slots 84, 86, and 88— so as to provide a gusseted structural connector.

Figure 4:
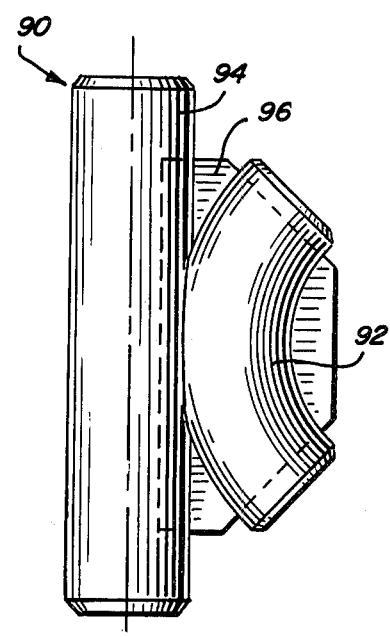

In FIG. 4, a connector 90 is shown to comprise an elbow 92, a length of straight pipe 94, and a plate 96, in an assembly similar to the assembly of FIG. 3, except that the elbow 92 and the pipe 94 are shown to have essentially equal outer diameters. The elbow 92 is shown to have a 90° included angle between its ends, but may have another angle as aforementioned and the connector 90 is symmetrical about an axis through the midpoints of the centerline of the pipe 94 and the centerline of the elbow 92. In other respects, the assembly of FIG. 4 is like the assembly of FIG. 3.

Such plates as are described above advantageously enhance the punch-out strength of the connectors so provided when such connectors are exposed to severe push-pull actions of winds and waves as in an offfshore drilling platform.

Although the connectors described above have exemplary dimensions suitable for an offshore drilling platform and outer large-scale structures, such connectors can also be made to smaller scales for smaller structures.

I claim:

1. A structural connector comprising: a pair of hollow elements having coplanar but non-parallel centerlines, one of said pair of elements having non-parallel open ends facing away from the second of said pair of elements, said second element having a pair of open ends and an elongated opening therebetween, said one element having a portion of its outer periphery extending into said opening and substantially closing same, said second element being rigidly joined to said one element around said opening, said second element also having a slot extending longitudinally in both directions from said opening and said one element having a slot in said portion of its outer periphery and extending therefrom in both directions and aligned with said slot of said second element, said one element also having a slot in its inner periphery, and a plate located in said slot of said second member and extending inwardly therefrom and in both slots of said first member, said plate being rigidly joined to said second and said one member about their respective slots.

2. The connector of claim 1 in which the centerline of said plate is coplanar with the centerlines of said pair of elements.

3. The connector of claim 2 in which said one element is an arcuate pipe elbow and said second element is a pipe.

4. The connector of claim 3 in which said connector is symmetric about an axis through the midpoints of the centerlines of said pair of elements.

5. The connector of claim 2 in which said one element is an arcuate pipe elbow and said second element is an arcuate pipe elbow.

6. The connector of claim 5 in which both elbows have slots in their inner peripheries and said plate extending therein and being rigidly joined thereabout.

7. The connector of claim 6 in which said connector is symmetric about an axis through the midpoints of the centerlines of both elbows.